United States Patent [19]

Suzuki et al.

[11] 4,127,500

[45] Nov. 28, 1978

[54] FIBROUS MATERIAL FOR EMULSION BREAKER AND METHOD FOR MANUFACTURING IT

[75] Inventors: Hideaki Suzuki, Machida; Tomoyoshi Ono, Hino; Wataru Yamamoto, Hachioji; Naoki Yamamoto, Machida, all of Japan

[73] Assignee: Teijin Limited, Osaka, Japan

[21] Appl. No.: 816,990

[22] Filed: Jul. 19, 1977

[30] Foreign Application Priority Data

Jul. 19, 1976 [JP] Japan .................................. 51-84937
Jul. 19, 1976 [JP] Japan .................................. 51-84938

[51] Int. Cl.$^2$ ............................................ B01D 17/04
[52] U.S. Cl. .................................... 252/358; 252/325; 526/21; 526/41; 526/51; 526/52
[58] Field of Search ............................... 252/358, 325; 260/2.1 E, 2.1 R; 526/21, 41, 51, 52; 8/115.5

[56] References Cited

U.S. PATENT DOCUMENTS

| | | | |
|---|---|---|---|
| 2,907,717 | 10/1959 | Hann | 252/325 |
| 3,927,968 | 12/1975 | Suzuki et al. | 8/115.5 |

*Primary Examiner*—Benjamin R. Padgett
*Assistant Examiner*—E. Suzanne Parr
*Attorney, Agent, or Firm*—Sughrue, Rothwell, Mion, Zinn and Macpeak

[57] ABSTRACT

A fibrous material useful for treating a waste water having a suitable amount and ratio of hydrophobic group and hydrophilic group is produced by reacting a fibrous material with sulfuric acid and/or chlorosulfonic acid, and then with alkylamines having 2 to 20 carbon atoms and optionally finally with, for example, ammonia, amines and/or hydrazines.

10 Claims, No Drawings

FIBROUS MATERIAL FOR EMULSION BREAKER AND METHOD FOR MANUFACTURING IT

BACKGROUND OF THE INVENTION

1. Field of the Invention

This invention relates to an emulsion breaking material applicable to a treatment of an emulsion of emulsifiable compound, especially of an emulsified oil, and also relates to a production process thereof.

More particularly, this invention relates to an emulsifiable compound treating material which is formed from an insoluble fibrous material having hydrophobic groups and hydrophilic groups in a suitable amount and a ratio, said material prepared by conducting chemical treatments of fibrous materials insolubilized by cross-linking fibrous materials of aromatic monovinyl polymers with sulfonyl groups.

2. Description of the Prior Art

Severe social problems have recently been raised about public hazards such as water pollution and sea corruption caused by the waste water containing emulsifiable compounds, especially by the waste water containing animal fats, plant and/or mineral oils.

Among the treatments of the waste water containing said compounds, the removal of an oil component from the waste water containing an emulsified oil, such as an oil emulsified by the addition of surfactant or extremely small oil particles, is very hard when compared to the removal of dispersed oil particles having larger diameters.

The above-described waste water is discharged from factories of various industries such as machinery industry, chemical industry, steel industry, as a matter of course, and food industry, paint industry and textile industry as well.

As a method for the treatment of the waste water containing an emulsified oil, hitherto, there are mentioned electrolytic process; oil-water separation by pressure/foam separation, flocculation precipitation or filtration with an addition of salting-out reagents, flocculating reagents or cohesive reagents; or extraction of oil using solvents.

Every method, however, has some disadvantages, for instance, (a) large scale equipment or time-consuming treatments are required to purify the waste water up to the undetectable concentration of oil.

(b) some of the abovementioned methods necessitate other subsequent treatments since they are not efficient enough to decrease the oil concentration less than 5 ppm of mineral oils and 30 ppm of animal and plant oils as suggested by the Country's Pollution Control Standards (hereinafter referred to as "CPCS").

The filtration treatment which separates oil from water with a filter having simpler apparatus and equipment is effective for the dispersion of free oil, however, it has a poor effect on the removal of emulsified oil of fine particles.

And a filter (fibrous filter), which may be highly effective for such emulsified oil, has not yet been put to practical use.

SUMMARY OF THE INVENTION

The objects of this invention are to provide an excellent emulsion-breaking fibrous material and a process for manufacturing said material.

The emulsion-breaking fibrous material in this invention is obtained by sulfonating and/or chlorosulfonating a fibrous material of aromatic monovinyl polymer, and further attaching hydrophobic groups and, if necessary, hydrophilic groups to sulfo groups and/or sulfochloride groups thereof to introduce hydrophobic groups and hydrophilic groups therein at a specific ratio.

DETAILED DESCRIPTION OF THE PREFERRED EMBODIMENTS OF THE INVENTION

This invention relates to:

(i) an emulsion-treating fibrous material prepared by a chemical modification of insoluble fibrous material obtained by crosslinking the fibrous material of aromatic monovinyl polymer with sulfonyl groups; wherein said fibrous material contains (a) 40 to 95 of the hydrophobic groups of the formula [I'] which is part of the group formula [I] per 100 of the aromatic nuclear structural units in the fibrous material;

Formula [I']:

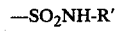  [I']

where R' represents a hydrocarbon group having 2 to 20 carbon atoms;

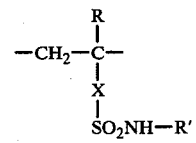  [I]

where X represents a phenylene and R represents a hydrogen atom or methylene originating from aromatic monovinyl, and (b) 1 to 30 of the hydrophilic groups of the formula [II'] which is part of the group formula [II] per 100 of the aromatic nuclear structural units in the fibrous material;

Formula [II']

$-SO_2A$  [II']

where A represents an atom or group selected from $-Cl$, $-OH$, $-NH_2$, $-NHNH_2$, $-NHCH_2CH_2OH$, $-N(CH_2CH_2OH)_2$, $-NHCH_3$ and $-N(CH_3)_2$;

Formula [II]

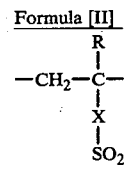  [II]

where R, X and A are as defined above and (ii) an emulsion-treating fibrous material of (i) wherein the numerical ratio between the group of formula [I'] and [II'] is in the range of the formula below, $0.01 \leq [II']/[I'] \leq 0.5$ and (iii) a process for manufacturing said fibrous material.

The aromatic monovinyl polymer used in the instant invention is (i) a polymer of aromatic monovinyl such as styrene, α-methylstyrene, vinyltoluene, halogenated styrene, vinylnaphthalene and/or vinylthiophene, preferably styrene;

(ii) a copolymer between at least one of aromatic monovinyl mentioned above and copolymerizable vinylcompounds such as propylene, ethylene, acrylonitrile, methacrylonitrile and/or vinylacetate;

(iii) a blend of the polymer (i) and the copolymer (ii) or (iv) a blend of one or more of (i), (ii) and (iii) and other copolymers.

When a copolymer or a blend is used in the invention, it is preferable to contain more than 30% (by weight) of aromatic monovinyl moiety (especially styrene moiety), more preferably more than 50%, especially more than 70%.

The blend of aromatic monovinyl polymer with a polymer of α-olefine such as polyethylene and polypropylene is preferable.

The fibrous material formed of aromatic monovinyl polymer used in the invention may include:

(i) fibre, filament and/or yarn (hereinafter referred to as "fiber") of optional deniers produced by melt-spinning, dry-spinning or wet-spinning the above polymers, copolymers or blends;

(ii) mixed fibers made from such fibers;

(iii) fibrous materials obtained by forming above polymers, copolymers or blends into films and by slitting the films thus obtained by any desired method;

(iv) fibrous materials obtained by extruding the above polymers together with a blowing agent through a die slit and drawing the extruded product in one direction;

(v) composite fibers of the fiber of said polymers with the fiber of other polymers; and (vi) staple fiber, web, mat, non-woven fabric and woven fabric made from the fiber or fibrous materials produced by an optional method.

Thus obtained fibrous material is crosslinked with chlorosulfonic acid to be made insoluble.

In the instant invention a fibrous form is essentially important to exhibit an effect of emulsion breaking and coalescing. Since a pre-insolubilized polymer has a poor fiber-formability, it is preferable to insolubilize the fibrous material made of non-crosslinked, non-insolubilized polymer.

Such insolubilization is performed by contacting said non-crosslinked fibrous material with chlorosulfonic acid.

According to this invention, the crosslinking reaction can be performed by contacting the filamentary structure with chlorosulfonic acid. The chlorosulfonic acid may be undiluted or diluted with a solvent. When the solvent is a good solvent for the aromatic monovinyl polymer, for example, methylene chloride, chloroform, 1,2-dichloroethane or tetrachloroethane, the concentration of chlorosulfonic acid should be at least 85% by weight, otherwise the form of the fibrous material cannot be retained. Where the solvent is a nonsolvent for the aromatic monovinyl polymer, for example, sulfuric acid, the concentration of chlorosulfonic acid should be not less than 30% by weight, otherwise the sulfone crosslinkages are not formed to the desired extent.

Taking as an example, polystyrene, this crosslinking insolubilizing reaction can be shown schematically as follows:

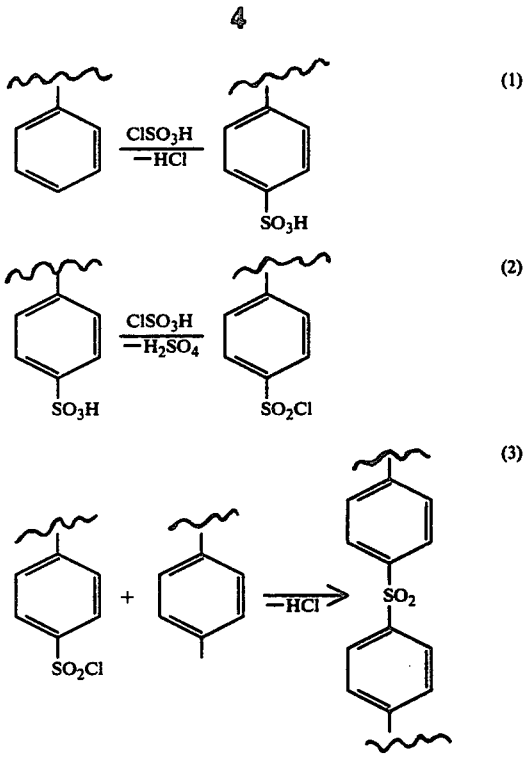

The crosslinking reaction consists of the above three stages. If the concentration of chlorosulfonic acid is low, the aromatic ring is consumed by reaction (1) before reaction (2) having a relatively slow rate of reaction proceeds. Therefore, the ratio of crosslinkages to be brought about by reaction (3) decreases (see Table-II). Furthermore, if the reaction temperature is low, reaction (3) proceeds to a greater extent since reaction (1) is more temperature dependent than reaction (3).

Therefore, a suitable reaction condition can be selected referring tables-I and -II to effect a desired rate of crosslinking in the range of 0 to 50% and the rate of chlorosulfonation in the range of 0 to 80%.

The reaction temperature is between −20° C. and 80° C., preferably 0° C. and 30° C.

The reaction time is between one second and 90 minutes, preferably 5 seconds and 30 minutes.

The rate of crosslinking is preferably between 0.5% and 40% in the invention.

The rate of crosslinking of 0.2% is enough to insolubilize the fibrous material; however, it can not prevent the swelling in a certain solvent.

The excess crosslinking more than 40% is not necessary for the purpose of insolubilization.

TABLE-I

Rate of Chlorosulfonation vs. Temperature and Time

| Time (min) | Rate of chlorosulfonation (%) Temp. | |
|---|---|---|
| | 5° C | 25° C |
| 0.2 | 2.0 | 5.0 |
| 0.5 | 6.0 | 12.5 |
| 1.0 | 25.0 | 35.5 |
| 2.0 | 36.5 | 54.5 |
| 3.0 | 40.5 | 59.5 |
| 4.0 | 45.5 | 63.5 |
| 5.0 | 53.5 | 65.0 |
| 10.0 | 57.5 | 68.5 |
| 15.0 | 58.5 | 68.5 |
| 20.0 | 58.5 | 68.5 |

TABLE-II

Rate of crosslinking vs. Temperature and Time
R.T.: Reaction Temperature
Chlorosulfonic acid 100%

| Time (min) | Rate of crosslinking (%) R.T. | |
| --- | --- | --- |
| | 5° C | 25° C |
| 0.2 | 5.5 | 10.5 |
| 0.5 | 7.0 | 13.5 |
| 1.0 | 10.5 | 17.0 |
| 2.0 | 14.5 | 20.5 |
| 3.0 | 19.0 | 25.0 |
| 4.0 | 22.5 | 27.5 |
| 5.0 | 32.5 | 29.5 |
| 10.0 | 38.0 | 31.5 |
| 15.0 | 41.5 | 31.5 |
| 20.0 | 41.5 | 31.5 |

The actual operation of the crosslinking reaction is not particularly restricted, and any desired means can be employed which will ensure a uniform contact between the fibrous material and chlorosulfonic acid. For example, the fibrous material may be dipped in chlorosulfonic acid, or passed through a chlorosulfonic acid bath, or chlorosulfonic acid may be sprayed onto the fibrous material.

An insoluble fibrous material thus obtained by crosslinking with sulfonyl groups is reacted with amines having hydrophobic groups, if necessary after the sulfonation or chlorosulfonation; and is reacted with, for example, ammonia, amines and/or hydrazines, if necessary, to introduce a suitable amount of hydrophilic group into the fibrous material polymer.

The emulsion treating material satisfying the condition mentioned above is prepared through the above-mentioned process.

Conventional sulfonating reagents or chlorosulfonating reagents can be used in conventional methods for sulfonating or chlorosulfonating the insoluble fibrous material with sulfone linkage made from aromatic monovinyl polymers.

As examples of sulfonating reagent there may be mentioned conc. sulfuric acid, fuming sulfuric acid and sulfuric acid anhydride.

As for chlorosulfonating reagent there is chlorosulfonic acid.

The chlorosulfonation can be achieved by treating with chlorinating reagents such as thionylchloride and/or phosphorous chlorides after the sulfonation with the sulfonating reagent mentioned above.

The reaction condition varys according to the sulfonating reagent used.

When conc. sulfuric acid is used, for example, reaction temperature is between 30° C. and 150° C., preferably between 60° C. and 120° C., reaction time is between 5 minutes and 120 minutes, preferably between 10 minutes and 60 minutes.

The insoluble fibrous material with a sulfone linkage made from aromatic monovinyl polymer is stable in the temperature range mentioned above and under chemical conditions because of its linkage; however, when the fibrous material contains blending components or copolymer other than aromatic monovinyl component with poor resistance to heat or chemicals, the reaction condition should be kept as moderate as possible.

Fuming sulfuric acid or catalyst such as silver sulfate may optionally be used to accerate the reaction rate.

When chlorosulfonic acid or its solution is used, the reaction temperature is between −20° C. and 50° C., preferably between 0° C. and 30° C., the reaction time is between one second and 60 minutes, preferably between 10 seconds and 30 minutes.

The actual operation of sulfonation or chlorosulfonation is not particularly restricted, and any desired means can be employed as far as they ensure a uniform contact between the fibrous material and the reagent.

Generally, the fibrous material is dipped in the reagent or its solution.

Sulfo group or sulfochloride group corresponding to 40–95 per 100 of aromatic monovinyl units in the fibrous material is reacted with amines having hydrocarbon group with 2–20 carbon atoms.

Hydrophobic groups are introduced into the fibrous material by the reaction mentioned above.

Hydrophilic groups are introduced into the fibrous material, if necessary, by reacting sulfo group or sulfochloride group corresponding to 1–30 per 100 of aromatic monovinyl units in the fibrous material with compounds, such as ammonia, amines or hydrazines, which form hydrophilic groups in the reaction.

Thus obtained fibrous material having a suitable amount of hydrophobic group and hydrophilic group can break and coalesce fine oil particles or emulsified oils in the waste water when it contact the waste water.

The effect to adsorb fine particles of emulsifiable compound depends on the fibrous material structure having said hydrophobic group and hydrophilic group together in the identical molecule.

Taking as an example, fine particles of an emulsified oil, the emulsion breaking effect may be explained as below.

The hydrophilic part of the emulsified oil particle is absorbed on the fibrous material under the suitable hydrophilic condition resulting from the interactive effect of hydrophobic and hydrophilic groups in the fibrous material.

Further the absorbed oil particle coalesces and grows larger to induce an emulsion breakage.

A hydrophobic part of the emulsified oil shows itself as the result of the emulsion breakage and is adsorbed by the fibrous material by an affinity with a hydrophobic part of the fibrous material.

In producing the material of this invention, primary, secondary or tertiary amines are used as the amines.

As examples of amines having hydrophobic groups there may be mentioned:

(i) alkylmonoamines having 2–20 carbon atoms such as ethylamine, propylamine, buthylamine, amylamine, hexylamine, octylamine, decylamine, undecylamine, laurylamine and stearylamine;

(ii) arylmonoamines such as aniline, methylaniline, toluidine and anisidine; and (iii) aralkylmonoamines such as benzilamine, phenethylamine, N-methylamiline and phenylpropylamine.

As examples of amines giving hydrophilic groups to the fibrous material there may be mentioned:

(i) methylamine, dimethylamine and trimethylamine;

(ii) polyamines such as ethylenediamine, hexamethylenediamine, diethylenetriamine, triethylenetetramine and tetraethylenepentamine; and (iii) aminoalcohols such as ethanolamine and diethanolamine.

As examples of hydrazines there may be mentioned hydrazine, hydrazine hydrate, methylhydrazine and phenylhydrazine.

The reaction between nucleophilic reagents mentioned above and the fibrous material can be performed by dipping the sulfonated or chlorosulfonated fibrous material in said compound or its solution.

As the effect of emulsion breaking of the fibrous material depends on the suitable amount of hydrophobic groups and the suitable amount of hydrophilic groups contained therein, the hydrophilic groups necessitate the coexistance with the hydrophobic groups.

Therefore, the rate of reaction of amines having hydrophobic groups with sulfo groups or sulfochloride groups in the fibrous material should be controlled in the range of 40 to 95 per 100 of the aromatic nuclear structural units in the fibrous material to leave the certain amount of the sulfo group or sulfochloride group unreacted.

The restriction of the reaction can be effected by controlling the temperature, the time and the concentration of the amines in the reaction mentioned above.

Table-III shows the rate of reaction between amines and sulfochloride group in the chlorosulfonated fibrous material in its relation with the reaction temperature and time.

Table-IV shows said rate of reaction in its relation with the reaction time and the concentration of amines.

The control of the rate of reaction in the range of 40-95% is achieved by selecting the reaction condition referring to Tables-III and -IV.

The reaction temperature is in 0°-100° C., preferably 5°-60° C., especially 10°-40° C.

The reaction time is selected from a range of 10 seconds to 10 minutes, preferably 30 seconds to 5 minutes, especially one minute to 3 minutes in consideration of the procedure.

On the other hand, the reaction between amines and the sulfonated fibrous material is conducted at the reaction temperature of 50°-200° C., preferably 70°-150° C., especially 90°-120° C. and for the time of 10 minutes — 2 hours, preferably 30 minutes — one hour.

The remaining sulfo group or sulfochloride group in the fibrous material is reacted completely with the ammonia analogue to introduce the hydrophilic group into the fibrous material at temperatures of 0°-100° C. and for the time of one minute–60 minutes in an aqueous solution.

Table-III

Rate of reaction vs. Temperature and Time
Amine concentration: 2 wt. %

| | Rate of reaction (%) Temp. | | | |
|---|---|---|---|---|
| Time (sec) | 0° C | 10° C | 20° C | 40° C |
| 10 | 8.8 | 10.2 | 24.8 | 40.0 |
| 20 | 19.5 | 24.5 | 51.2 | 65.0 |
| 30 | 22.8 | 34.7 | 62.5 | 71.6 |
| 60 | 50.3 | 66.4 | 75.0 | 88.2 |
| 90 | 65.7 | 78.0 | 89.6 | 93.0 |
| 120 | 74.6 | 88.7 | 93.5 | 93.5 |
| 180 | 80.0 | 88.9 | 95.0 | 96.0 |
| 240 | 86.1 | 90.7 | 96.2 | 96.0 |
| 300 | 89.2 | 91.0 | 96.0 | 96.5 |
| 360 | 89.9 | 92.8 | 96.5 | 97.8 |

TABLE-IV

Rate of reaction vs. Time and Amine concentration
Temperature: 20° C
*: Amine concentration

| | Rate of reaction (%) *conc. | | |
|---|---|---|---|
| Time (sec) | 0.5% | 2% | 5% |
| 10 | 12.5 | 24.8 | 38.2 |
| 20 | 23.8 | 51.2 | 58.3 |
| 30 | 36.1 | 62.5 | 70.8 |
| 60 | 62.7 | 75.0 | 88.0 |
| 90 | 75.6 | 89.6 | 93.5 |
| 120 | 80.4 | 93.5 | 95.2 |
| 180 | 86.8 | 95.0 | 96.8 |
| 240 | 90.0 | 96.2 | 96.4 |
| 300 | 90.2 | 96.0 | 96.9 |
| 360 | 91.0 | 96.5 | 96.9 |

Accordingly the amount of hydrophobic group and hydrophilic group and the ratio between them should be controlled in the first reaction of amines where hydrophobic groups are introduced into the fibrous material.

In case where the sulfonated fibrous material is used, after the reaction with amines having hydrophobic groups and before the reaction with the ammonia analogue, it is preferable to employ acid treatment.

According to the present invention, the emulsion breaker and coalescer composed of the insoluble fibrous material having 40 to 95 of hydrophobic group per 100 of aromatic monovinyl structural units in the fibrous material is produced.

When the hydrophobic group is less than 40%, it is difficult for the fibrous material to possess the proper amount of hydrophobic group and hydrophilic group to exhibit the effective emulsion breaking and therefore the efficiency of removal of an emulsified oil extremely decreases.

On the other hand, when the hydrophobic group is more than 95%, it takes much time to produce the fibrous material and the fibrous material thus obtained does not exhibit a practical removal effect of an emulsified oil because of its low hydrophilicity.

Lower amount of hydrophilic group less than 1% is not enough for a suitable degree of hydrophilicity, and higher amount of hydrophilic group more than 30% disturbs the suitable balance between hydrophobic and hydrophilic groups because of excess hydrophilicity, and consequently the emulsion breaking efficiency becomes low.

Furthermore, the particularly preferable ratio between the hydrophilic group and hydrophobic group is in the range of 0.01–0.5 (numerical base).

The removal of the emulsified oil using the emulsion breaker (coalescer) in this invention can be performed basically by an effective contact of the waste water containing an emulsified oil with the fibrous material.

Therefore any means can be employed as far as they ensure an effective contact of the waste water with the fibrous material.

Usually, the use of fibrous material is practiced by passing the waste water through it.

For example, the fibrous emulsion treating material is filled in the column and the waste water containing an emulsified oil is passed therethrough using a pump.

A method where the fibrous material is dipped with an airation in the waste water containing an emulsified oil also exhibits an effective removal.

According to this invention, the emulsion breaking effect often remains even after the fibrous material is fully loaded with an adsorbed oil because of its excellent ability to grow fine particles larger and break the emulsion.

In such case, the treated water becomes opaque; however, it will be clarified by treating with a conventional hydrophobic oil adsorbent for free oil use.

For the above reasons, the emulsified oil can be treated more effectively by using the emulsion breaker in this invention combined with a conventional oil adsorbent for free oil use.

The fibrous material fully loaded with an adsorbed oil for no further use can be reclaimed by a desorption of the oil by washing with a conc. alkali or acid aqueous solution of about 1–5N or an organic solvent such as methanol.

The emulsion treating material produced by this invention is effective on the removal of an emulsified oil composed of mineral, animal or plant oil.

For example, drain from compressors, waste water containing a cutting oil and a surfactant, waste washing water from rolled steel mills or waste water from car washing can be treated and the emulsified oil therein can be removed effectively.

One of the excellent characteristics of this treating material is that even the emulsified oil containing a nonionic surfactant, which is considered difficult to treat after conventional methods, can be treated effectively.

The emulsion treating material of this invention can stand solvents without swelling or being solved, and maintain good filterability and oil removing performance.

The removal effect of the fibrous material of this invention obtained by passing the waste water containing an emulsified oil through the column filled with the fibrous material reaches to such a degree which cannot be detected with n-hexane extraction method even in the case where the emulsified oil is composed of fine particles of less than 10μ diameter.

Furthermore the mineral oil can be removed to a concentration of less than 5 ppm (CPCS).

Thus, this invention ensures an epock-making method which can remove an oil up to the concentration lower than CPCS with a simple procedure that is merely letting a waste water pass through a packed-column of the fibrous oil separater.

This fibrous material may well claim an industrially useful material for removing environmental hazards in view of its low cost not requiring expensive equipment and facilities of pollution disposal.

The invention will be illustrated more specifically by the following Examples in which all parts, percentages (%) and parts per million (ppm) are by weight.

The "rate of crosslinking", "content of hydrophobic group", "content of hydrophilic group" and "oil concentration" were measured and determined as described below.

Rate of crosslinking

The rate (percent) of crosslinking with chlorosulfonic acid was calculated on the basis of the following equation, assuming that the increase in weight owing to the crosslinked sulfonyl groups is obtained by subtracting Y, which is the weight increase owing to the sulfochloride groups as measured from the chlorine analysis value, from X which is the total weight increase owing to the treatment with chlorosulfonic acid.

$$\text{Rate of crosslinking (\%)} = \frac{2 \times (\frac{X-Y}{62}) \times 100}{\text{Mols of the aromatic monovinyl structural unit in the fibrous material}}$$

Content of hydrophobic group

The content of hydrophobic group was evaluated from the nitrogen atom content measured by the elementary analysis.

The insoluble fibrous material sulfonated or chlorosulfonated was reacted with the above-mentioned amines having hydrophobic groups, and washed to remove the unreacted amines and dried completely.

The dried fibrous material was subjected to the elementary analysis, and the nitrogen atom content was obtained.

The nitrogen atom number (hereinafter referred to as $N_1$) corresponds to the number of hydrophobic group contained in the fibrous material.

Content of hydrophilic group

There are three methods for the evaluation of the content of hydrophilic group by types of group.

That is, A in the formula [II'] below $$-SO_2A \qquad [II']$$

represents three types of atom or group following;

case (i): OH
case (ii): Cl
case (iii): group containing n nitrogen atoms.

case (i) A:OH

The content of hydrophilic group ($-SO_3H$) was calculated from the measurement by neutralization analysis with NaOH standard solution.

case (ii) A:Cl

The content of hydrophilic group ($-SO_2Cl$) was calculated from the content of chlorine atom measured by the elementary analysis.

case (iii) A: group containing n nitrogen atoms

The fibrous material reacted with amines was washed and dried.

The nitrogen atom content (hereinafter referred to as $N_2$) was measured by the elementary analysis.

The content of hydrophilic group was calculated from the following equation:

$$\text{Content of hydrophilic group} = \frac{N_2 - N_1}{n}$$

Oil concentration

The oil concentration (ppm) was calculated from the amount of oil (mg) contained in 1 kg of the waste water measured by the following "n-hexane extraction method of JIS (Japan Industrial Standards) K-0102".

n-Hexane extraction method

The sample (waste water in this case) was adjusted to a pH of less than 4.0, and contacted with n-hexane.

The n-hexane phase, after separated from the water phase, was evaporated to remove n-hexane.

The residue thus obtained was hydrocarbon, its derivatives, grease and/or other oily substances.

This is the oily substance contained in the waste water.

EXAMPLE 1

Nitrogen gas was introduced under a pressure of 15 Kg/cm$^2$ into molten polystryrene at a temperature of about 250° C. in an extruder, and it was thoroughly kneaded. The mixture was extruded from a die through a slit with a clearance of 0.225 mm and a width of 150 mm, and at the die exit, cooling air of about 20° C. was blown against the extruded, molten polymer mixture. Thus the extrudate was quenched to 55° C. and then withdrawn at a draft ratio of 150 and wound up. Then, 40 such wound-up sheets were laminated, opened in the transverse direction at an opening ratio of 10 times, and integrated by passing through, a roller press with a pressure of 40 kg/cm$^2$. Thus a sheetlike fibrous material having a reticulate fibrous structure was obtained.

The resulting fibrous material was dipped in chlorosulfonic acid at 25° C. for 10 minutes. It was then washed well in methylene chloride to remove the unreacted chlorosulfonic acid. Then, it was dipped in methanol to decompose and remove the unreacted chlorosulfonic acid completely.

The crosslinked fibrous material thus obtained was insoluble even in methylene chloride, a good solvent for polystyrene, and maintained its original fibrous form completely unchanged.

The fibrous material had a rate of crosslinking of 31.5% and a rate of chlorosulfonation of 68.5% based on the number of aromatic nucleus in the fibrous material.

This crosslinked, insolubilized fibrous material was then immersed in a stearylamine solution (2% in methylenechloride) at about 25° C. for one minute, and washed with methanol and water to give a white fibrous material.

The content of hydrophobic group (N-stearylsulfonamide group) of this fibrous material was 58.5%, and the content of hydrophilic group (sulfochloride group) thereof was 10.0%, both based on the aromatic monovinyl units. A 14-mm dia. glass column was filled with 2.6 gr of this fibrous material (column 1), and a waste water containing 100 ppm of emulsified oil (particle diameter: 1 ~ 10μ) of a cutting-oil ("KUTWELL" made by ESSO Petroleum K.K.) was let pass through the column 1 at a flow rate of 10 ml/minute (SV = 30).

The oil concentration of the treated waste water was measured at predetermined intervals by the n-hexane extraction method.

The results are shown in Table-V.

Further, when the discharging treated waste water was observed containing oil, the discharging water was treated again with 2.0 gr of a free oil-treating material (polystyrene fiber) packed in another column (column-2).

As the oil particles, in the discharging water grew large in the first column, they could be removed even with the second column.

TABLE-V

| Waste water treated (l) | Oil concentration of waste water (ppm) | |
|---|---|---|
| | After treatment with column-1 | After treatment with column-1 and column-2 |
| 1.0 | 0.0 | — |
| 5.0 | 0.0 | — |
| 10.0 | 0.0 | — |
| 20.0 | 0.5 | 0.0 |
| 30.0 | 1.3 | 0.0 |
| 40.0 | 1.4 | 0.0 |
| 50.0 | 4.8 | 0.0 |
| 60.0 | 6.5 | 0.0 |
| 70.0 | 8.0 | 0.0 |

EXAMPLE 2

A sheet-like fibrous material having a reticulated fibrous structure composed of 90 parts of polystyrene and 10 parts of polypropylene produced in the same way as in Example 1 was reacted with chlorosulfonic acid in the same way as in Example 1.

Thus obtained fibrous material was dipped in a 2-ethyl-1-hexylamine solution (2% in methylenechloride) at about 25° C. for one minute, and washed with methanol and water to give the treating material having 64.5% of hydrophobic group (N-octylsulfonamide group) and 4.0% of hydrophilic group (sulfochloride group) based on the aromatic monovinyl units contained therein.

A waste water containing 100 ppm of emulsified cutting oil ("KUTWELL 40" made by ESSO Petroleum K.K.) was passed through a 14-mm dia. column filled with 2.5 gr of the fibrous material at a flow rate of 10 ml/min. (SV ≈ 30).

20 l of the waste water was treated and the oil content decreased from 100 ppm to 1.8 ppm.

EXAMPLE 3

A mixture of 85 parts of polystyrene and 15 parts of toluene was kneaded at 165° C. and fed continuously into a 10-cm dia. column having many holes of 0.5–1.0-mm dia. on the side walls rotating at 5000 r.p.m.

From the molten polymer was ejected by a centrifugal force through the tiny holes to form a fiber flock like a candy fluff while toluene evaporated.

Thus obtained fiber flock was gathered and pressed to give a non-woven fabric sheet.

The non-woven fabric sheet was immersed in chlorosulfonic acid at 25° C. for 10 minutes, and after having been wrung it was washed with methylenechloride and dipped in methanol to decompose and remove the slightly remaining chlorosulfonic acid.

Thus obtained non-woven fabric had a rate of crosslinking of 30.5% and a rate of chlorosulfonation of 69.5%.

This chlorosulfonated non-woven fabric was then immersed in a n-propylamine solution (5% in water) at 25° C. and for one minute, and washed with water.

An emulsified oil-treating material having hydrophobic group (N-propylsulfonamide group) of 66.5% and hydrophilic group (sulfochloride group) of 3.0% based on aromatic monovinyl units in fibrous material was obtained.

2.8 gr of this fibrous material in a shape of nonwoven fabric was filled in a glass column with 14-mm dia. and passed with 20 l of waste water containing 100 ppm of an emulsified cutting oil ("KUTWELL 40" made by ESSO Petroleum K.K.) at a rate of 10 ml/min. (SV ≈ 30).

The oil concentration decreased from 100 ppm to 3.5 ppm.

EXAMPLE 4

A fibrous material having a reticulated fibrous structure composed of 90 parts of polystyrene and 10 parts of polypropylene was produced and then chlorosulfonated in the same way as in Example 1.

The fibrous material was dipped in a stearylamine solution (2% in methylenechloride) at 25° C. and for 50 seconds and washed with methanol and water.

The fibrous material having 52% of hydrophobic group (N-stearylsulfonamide group) and 16% of hydrophilic group (sulfonic acid group) based on aromatic monovinyl units in the fibrous material was obtained.

4.0 gr of thus obtained fibrous material was packed in a glass column with 14-mm dia. and contacted with 100-ml of 1N NaOH aqueous solution passing therethrough at a flow rate of 5 ml/min. and at 25° C. to hydrolyze the remaining sulfochloride group.

An opaque compressor drain with an oil content of 350 ppm was passed through the above column at a flow rate of 10 ml/min. (SV ≈ 20) and the oil content of the treated waste water was measured.

The column was reclaimed with 50 ml of 1N.NaOH aqueous solution when the treated waste water became slightly opaque and reused.

The results are shown in Table-VI below.

TABLE-VI

| Waste water treated (l) | Oil concentration of treated waste water (ppm) |
|---|---|
| 1 | 0.0 |
| 2 | 0.6 |
| 3 | 0.0 |
| 4 | 0.6 |
| 5 | 2.8 |
| Reclamation | |
| 6 – 9 | 0.0 – 0.8 |
| 10 | 4.9 |
| Reclamation | |
| 11 – 14 | 0.0 – 1.0 |
| 15 | 4.5 |
| Reclamation | |
| 16 – 19 | 0.0 – 1.2 |
| 20 | 8.3 |
| Reclamation | |
| 21 – 24 | 0.0 – 1.5 |
| 25 | 3.2 |
| Reclamation | |
| 26 – 29 | 0.0 – 1.2 |
| 30 | 5.8 |

EXAMPLE 5

(i) A fibrous material having a reticulated fibrous structure composed of 90 parts of polystyrene and 10 parts of polypropylene was produced and then chlorosulfonated in the same way in Example 2.

The fibrous material was dipped in a stearylamine solution (4% in methylenechloride) at 20° C. and for 3 minutes and washed with methanol and water.

The fibrous material was then dipped in a hydrazine hydrate solution (10% in water) at 20° C. for 10 minutes to change sulfochloride groups remaining in the fibrous material to sulfohydrazide groups and washed with water.

Thus, the fibrous material having 66.5% of hydrophobic group (N-stearylsulfonamide group) and 3.5% of hydrophilic group (sulfohydrazide group) based on aromatic monovinyl units in the fibrous material was obtained.

A waste water containing 10 ppm of the cutting oil ("KUTWELL 40" made by ESSO Petroleum K.K.) was passed through a 7-mm dia. glass column packed with 0.2 gr of the fibrous material (column-1) at a flow rate of 10 ml/min. (SV ≈ 270).

And after the oil content of the treated waste water exceeded 1 ppm, the treated waste water was passed through another column packed with a free oil adsorbent (polystyrene fiber) (column-2).

The results are shown in Table-VII below.

TABLE-VII

| Waste water treated (l) | Oil concentration of waste water (ppm) | |
|---|---|---|
| | After treatment with column-1 | After treatment with column-1 and column-2 |
| 0 – 33 | 0 – 1.0 | — |
| 33 – 48 | 1.0 – 2.0 | 0 |
| 49 – 55 | 2.0 – 3.0 | 0 – 0.5 |
| 55 – 60 | 3.0 – 5.0 | 0 – 0.5 |

(ii) In each of the two columns prepared like column-1 a waste water containing 300 ppm of cutting oil shown in Table-VIII was passed at a flow rate of 2 ml/min. (SV ≈ 60), and the total quantity of the respective waste water treated up to the time when the oil concentration thereof reached 5 ppm (CPCS) is shown in Table-VIII below.

TABLE-VIII

| Cutting oil | Waste water treated (l) |
|---|---|
| "KUTWELL 40" made by ESSO Petroleum K.K. | 1.8 |
| "GULF CUT SOLUBLE" made by IDEMITU KOSAN K.K. using non-ionic surfactant | 1.5 |

EXAMPLE 6

A fibrous material having a reticulated fibrous structure composed of 90 parts of polystyrene and 10 parts of polypropylene was produced in the same way as in Example 1 and treated with chlorosulfonic acid and stearylamine in the same way as in Example 5.

Thus obtained fibrous material was dipped in an aqueous solution of 10% ammonia at 20° C. for 10 minutes to change sulfochloride groups remaining in the fibrous material to sulfonamide groups.

The same treatment as in Example 5, (ii) was conducted using "GULF CUT SOLUBLE" (using a non-ionic surfactant made by IDEMITU KOSAN K.K.).

The total quantity of the waste water treated until the oil concentration thereof reached 5 ppm (CPCS) was 1.4 l.

EXAMPLE 7

A fibrous material having a reticulated fibrous structure composed of 90 parts of polystyrene and 10 parts of polypropylene was produced and reacted with chlorosulfonic acid in the same way as in Example 1, and then reacted with stearylamine by immersing in its solution (4% in methylenechloride), and then washed with methanol and water.

Thus obtained fibrous material was dipped in an aqueous solution of 10% ethanolamine at 25° C. for 10 minutes.

After the reaction was completed, the fibrous material was washed with water to afford a white fibrous treating material.

The fibrous material thus obtained had 67% of hydrophobic group (N-stearylsulfonamide group) and 3% of hydrophilic group {N-($\beta$-hydroxyethyl)-sulfonamide group} based on aromatic monovinyl units in the fibrous material.

The waste water containing 300 ppm of an emulsified cutting oil ("CIMIRON PA" using a non-ionic surfactant; made by DAIDO CHEMICAL INDUSTRY) was passed through a 14-mm dia. glass column packed with 4.0 gr of the above fibrous material at a flow rate of 10 ml/min. (SV $\approx$ 30), and the oil concentration of the treated waste water was measured.

The column was reclaimed for reuse when the treated waste water was found slightly opaque.

The reclamation was carried out by passing 60 ml of water and 100 ml of 0.5 N.NaOH aqueous solution.

The results are shown in Table-IX.

TABLE-IX

| Waste water treated (l) | Oil concentration of treated waste water (ppm) |
| --- | --- |
| 1 | 0.0 |
| 2 | 0.0 |
| 3 | 0.2 |
| 4 | 0.0 |
| 5 | 0.3 |
| 6 | 0.3 |
| 7 | 0.4 |
| 8 | 1.5 |
| Reclamation | |
| 9 – 15 | 0.0 – 1.2 |
| 16 | 3.8 |
| Reclamation | |
| 17 – 23 | 0.0 – 1.8 |
| 24 | 4.0 |

EXAMPLE 8

The fibrous material having a reticulated fibrous composed of 40 parts of polystyrene and 60 parts of polypropylene produced by the same way as in Example 1 was reacted with chlorosulfonic acid as in Example 1. Thus obtained fibrous material was dipped in a stearylamine solution (2% in methylenechloride) at 20° C. for 1 minute.

After washing the material thus obtained with methanol and water, the material was dipped in a hydrazine hydrate solution (10% in water) at 20° C. for 10 minutes and then washed with water.

The fibrous material had 55% of N-stearylsulfonamide group and 12% of sulfohydrazide group based on aromatic monovinyl units in the fibrous material.

3.0 gr of the fibrous material thus obtained was packed in a 14-mm dia. glass tube and 10 l of the waste water containing 10 ppm of the cutting oil ("KUTWELL 40" made by ESSO Petroleum K.K.) was passed therethrough at a flow rate of 5 ml/min. (SV $\approx$ 20).

The oil concentration of the treated waste water was 2 ppm.

EXAMPLE 9

The fibrous material having a rate of crosslinking of 20% and 50% of sulfochloride group based on aromatic monovinyl units therein was obtained by;

immersing the fibrous material having a reticulated structure composed of 90 parts of polystyrene and 10 parts of polypropylene produced by the same way as in Example 1 at 5° C. for 5 minutes in a chlorosulfonic acid solution;

decomposing the unreacted chlorosulfonic acid with methanol; and finally washing with water.

Thus obtained fibrous material was dipped in a stearylamine solution (2% in methylenechloride) at 20° C. for one minute, and washed with methanol and water, and then immersed in a hydrazine hydrate solution (10% in water) at 20° C. for 10 minutes.

The chemically modified fibrous material thus obtained had 38% of N-stearylsulfonamide group and 10% of sulfohydrazide group based on aromatic monivinyl units in the fibrous material.

A waste water containing 100 ppm of the cutting oil ("KUTWELL 40" made by ESSO Petroleum K.K.) was passed through the glass column having 14-mm dia. packed with 3.0 gr of the fibrous material thus obtained at a flow rate of 5 ml/min. (SV $\approx$ 20).

25 l of the waste water could be treated before the oil concentration of treated water reached at 5 ppm.

EXAMPLE 10

The fibrous material having a reticulated structure composed of 90 parts of polystyrene and 10 parts of polypropylene produced by the same way as in Example 1 was treated with chlorosulfonic acid and stearylamine by the same way as in Example 5.

The sulfochloride group remaining in the fibrous material was then converted into N-methylsulfonamide group by immersing the fibrous material in a monomethylamine solution (10% in water) at 20° C. for 10 minutes.

A waste water containing 300 ppm of the cutting oil ("KUTWELL 40" made by ESSO Petroleum K.K.) was passed through the glass tube of 7-mm dia. packed with 0.2 gr of the fibrous material thus obtained at a flow rate of 2 ml/min. (SV $\approx$ 60).

1 l of the waste water was treated before the oil concentration of the treated water reached to 5 ppm.

EXAMPLE 11

The fibrous material having a reticulated structure composed of 90 parts of polystyrene and 10 parts of polypropylene produced by the same way as in Example 1 was treated with chlorosulfonic acid as in Example 1.

Eight (8) pieces of thus obtained fibrous material were immersed in a stearylamine solution (5% in methylene-chloride) at 20° C. for predetermined periods shown in the table-X below respectively to afford fibrous materials with various amination rates.

After washing with methanol and water, 0.2 gr of each fibrous material was packed into a glass tube of 7-mm dia. respectively.

A waste water containing 100 ppm of the cutting oil ("KUTWELL 40" made by ESSO Petroleum K.K.) was passed through the glass tube respectively at a flow rate of 2 ml/min.

The oil concentration of the treated water was measured respectively and the results are shown in the table-X below.

TABLE-X

| No | Aminating period (sec) | % of stearyl- sulfonamide [I'] (—SO$_2$NHC$_{18}$H$_{37}$) | % of —SO$_2$Cl [II'] | [II']/[I'] | Removal of emulsified oil % |
| --- | --- | --- | --- | --- | --- |
| 1 | 10 | 24.2 | 44.8 | 1.85 | 12 |
| 2 | 20 | 33.8 | 35.3 | 1.05 | 25 |
| 3 | 30 | 38.1 | 31.1 | 0.82 | 28 |
| 4 | 45 | 46.3 | 22.2 | 0.48 | 78 |
| 5 | 60 | 52.3 | 16.5 | 0.32 | 96 |
| 6 | 120 | 60.5 | 8.3 | 0.14 | 100 |
| 7 | 300 | 65.7 | 3.2 | 0.05 | 100 |
| 8 | 600 | 69.2 | 0.7 | 0.01 | 82 |

EXAMPLE 12

The same experiments as in Example 11 were conducted, excepting that after the stearylamination and the washing each piece of the fibrous material was immersed in a hydrazine hydrate solution (10% in water) at 20° C. for 10 minutes to convert the remaining sulfochloride groups into the sulfohydrazide groups.

And the results are shown in the table-XI below.

TABLE-XI

| No | Aminating period (sec) | % of —SO$_2$NHC$_{18}$H$_{37}$ [I'] | % of —SO$_2$NHNH$_2$ [II'] | [II']/[I'] | Removal of emulsified oil (%) |
| --- | --- | --- | --- | --- | --- |
| 1 | 10 | 22.9 | 46.1 | 2.01 | 23 |
| 2 | 20 | 34.8 | 33.9 | 0.97 | 39 |
| 3 | 30 | 38.1 | 30.7 | 0.81 | 52 |
| 4 | 45 | 46.0 | 22.8 | 0.50 | 98 |
| 5 | 120 | 61.6 | 7.2 | 0.12 | 100 |
| 6 | 300 | 66.3 | 2.1 | 0.03 | 100 |
| 7 | 600 | 68.7 | 0.7 | 0.01 | 90 |

EXAMPLE 13

Nitrogen gas was introduced under a pressure of 15 kg/cm$^2$ into molten polystyrene at a temperature of about 250° C. in the extruder, where it was thoroughly mixed. The mixture was extruded from a die through a slit of 0.225 mm × 150 mm, and just beneath the die, cooling air of about 20° C. was blown against the extruded, molten polymer mixture to quench it to 55° C.

The extrudate was then withdrawn at a rate of 40 m/min. and wound 300 m apiece.

From five (5) bobbins each wound with this fibrous material set on a bobbin holder, a five-ply fibrous seet material was formed through rolls; and conducted to the serial processes composed of chlorosulfonation, water-washing, stearylamination in 5% methylenechloride solution, washing with methylenechloride, water-washing, dipping in a hydrazine hydrate solution (10% in water), water-washing and drying with the use of a continuous line of reaction device composed of rolls, reaction bath, press-rolls and washing bath; and wound.

The circumferencial speed of the rolls, the duration of chlorosulfonation, the duration of stearylamination and the duration of hydrazine hydrate treatment were adjusted at 0.5 m/min., for one minute, 3 minutes and 2 minutes respectively.

Each reaction was conducted at 20° C.; however, the temperature in the chlorosulfonic acid bath rose up to 30° C.

The fibrous material thus obtained had 64% of hydrophobic group of N-stearylsulfonamide group and 8% of hydrophilic group of sulfohydrazide group based on the aromatic monovinyl units.

This fibrous material of 150 mm width and 300 m length was cut into 10 m length apiece. The sheet were laid in 5 layers to make them weigh 0.75 kg/m$^2$ and the layers were placed side by side in 6 rows, upon which "OLSORB" polystyrene web of Teijin of 900 mm. width (weighing 0.5 kg/m$^2$) was laid and needle punched to obtain a felt like emulsion breaker, 9-mm thick, weighing 1.5 kg/cm$^2$.

Thus obtained emulsion breaker was cut into a disk of 230 mm diameter, 20 pieces in a unit of which were stuck into each of the pair of 200-mm. in. dia. columns arranged in a row on the emulsion treating device.

Waste water from a plating plant containing 100 ppm of emulsified oil was let pass through the columns at a flow rate of 200 l/h.

The pressure required for flowing the waste water showed 0.9–1.0 kg/cm$^2$ and the oil concentration of the treated water was 0.5–1.0 ppm. After 100-hr treatment, the pressure rose to 1.1 kg/cm$^2$ and the oil content reached 1.2 ppm and the treatment was stopped.

COMPARATIVE EXAMPLE

The fibrous material having a reticulated structure composed of 90 parts of polystyrene and 10 parts of polypropylene produced by the same way as in Example 1 was chlorosulfonated by the same way as in Example 1.

The fibrous material thus obtained was immersed in a monomethylamine solution (5% in water) at 20° C. for one minute to perform the amination and washed with water.

A fibrous material having 67.0% of N-methylsulfonamide group and 3.0% of sulfochloride group based on the aromatic monovinyl units was obtained.

A waste water containing 100 ppm of the cutting oil ("KUTWELL 40" made by ESSO Petroleum K.K.) was passed through a glass column of 14-mm dia. packed with 3.0 gr of thus obtained fibrous material at a flow rate of 10 ml/min. (SV ≈ 30).

An oil concentration of the treated waste water was 70 ppm.

What we claim is:

1. An emulsion-treating fibrous material prepared by a chemical modification of insoluble fibrous material obtained by crosslinking with a sulfonyl group the fibrous material of aromatic monovinyl polymer; said fibrous material containing (a) 40 to 95 of the hydrophobic group of the formula [I'] which is part of the formula [I] per 100 of the aromatic nuclear structural units in the fibrous material;

Formula [I']:

$$-SO_2NH-R' \qquad [I']$$

where R' represents a hydrocarbon group having 2 to 20 carbon atoms;

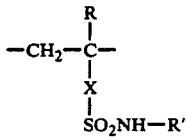

where X represents a phenylene and R represents a hydrogen atom or methyl originating from aromatic monovinyl, and (b) 1 to 30 of the hydrophilic group of the formula [II'] which is part of the group of the formula [II] per 100 of the aromatic nuclear structural units in the fibrous material;

Formula [II']:

  [II']

where A represents an atom or group selected from —Cl, —OH, —NH$_2$, —NHNH$_2$, —NHCH$_2$CH$_2$OH, —N(CH$_2$CH$_2$OH)$_2$, —NHCH$_3$ and —N(CH$_3$)$_2$;

Formula [II]

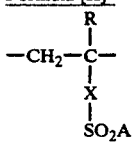  [II]

where R, X and A are as defined above.

2. An emulsion-treating fibrous material of claim 1 wherein the numerical ratio between the group of formula [I'] and [II'] is in the range of the formula below:

$0.01 \leq [II']/[I'] \leq 0.5$

3. A process for preparing a fibrous material, which comprises:

(a) conducting a reaction between sulfuric acid, chlorosulfonic acid, or mixtures thereof and a fibrous material made from an aromatic monovinyl polymer to crosslink by sulfonyl group (—SO$_2$—) within a range of rate of crosslinking of 0.5% to 40% and to introduce sulfo groups sulfochloride groups, or mixtures thereof into the fibrous material, (b) reacting the partially crosslinked and sulfonated fibrous material, chlorosulfonated fibrous material or mixtures of sulfonated and chlorosulfonated fibrous material with alkylamines having alkyl groups of 2 to 20 carbon atoms to convert 40 to 95 of sulfo group, sulfochloride group, or mixtures thereof based on 100 of the aromatic nuclear units into —SO$_2$NHR' where R' represents a hydrocarbon group having 2 to 20 carbon atoms.

4. A process for preparing a fibrous material of claim 3 which comprises reacting the fibrous material with ammonia, hydrazines, amines, or mixtures thereof whereby 1 to 30 of sulfo group, sulfochloride group, or mixtures thereof per 100 of the aromatic nuclear structural units in the fibrous material is converted into

where A represents —NH$_2$, —NHNH$_2$, —NHCH$_2$CH$_2$OH, —N(CH$_2$CH$_2$OH)$_2$, —NHCH$_3$ or —N(CH$_3$)$_2$.

5. An emulsion-treating fibrous material of claim 1, wherein A is —Cl.

6. An emulsion-treating fibrous material of claim 1, wherein A is —OH.

7. An emulsion-treating fibrous material of claim 1, wherein A is selected from —NH$_2$, —NHNH$_2$, —NHCH$_2$CH$_2$OH, —N(CH$_2$CH$_2$OH)$_2$, —NHCH$_3$ and —N(CH$_3$)$_2$.

8. A process for preparing a fibrous material of claim 4, wherein said fibrous material has emulsion-treating capability.

9. A process for preparing a fibrous material of claim 8, wherein said —SO$_2$NHR' groups provide said fibrous material with hydrophilicity and said —SO$_2$A groups provide said fibrous material with hydrophobicity.

10. A process for preparing a fibrous material of claim 8, wherein the numerical ratio between the groups having the formula —SO$_2$NHR' and the said groups having the formula —SO$_2$A is in the range:

$0.01 \leq [-SO_2A]/[-SO_2NHR'] \leq 0.5$.

* * * * *